July 22, 1947.　　　　W. C. FORD　　　　2,424,354
AMUSEMENT DEVICE
Filed Feb. 15, 1946　　　3 Sheets-Sheet 1
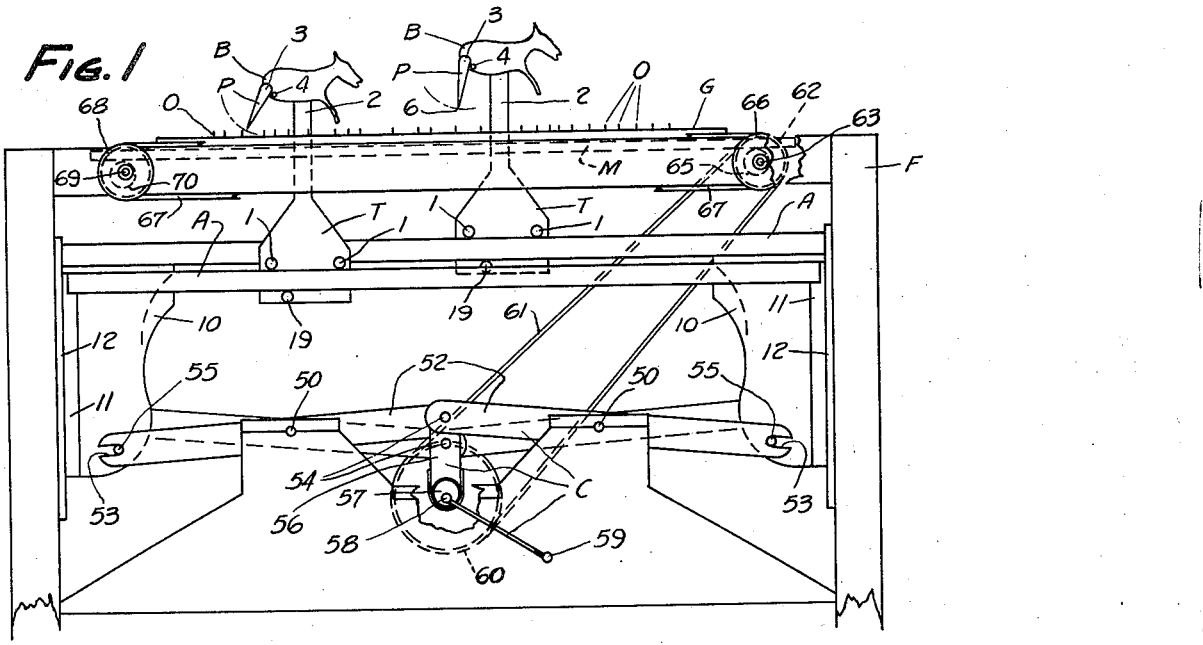
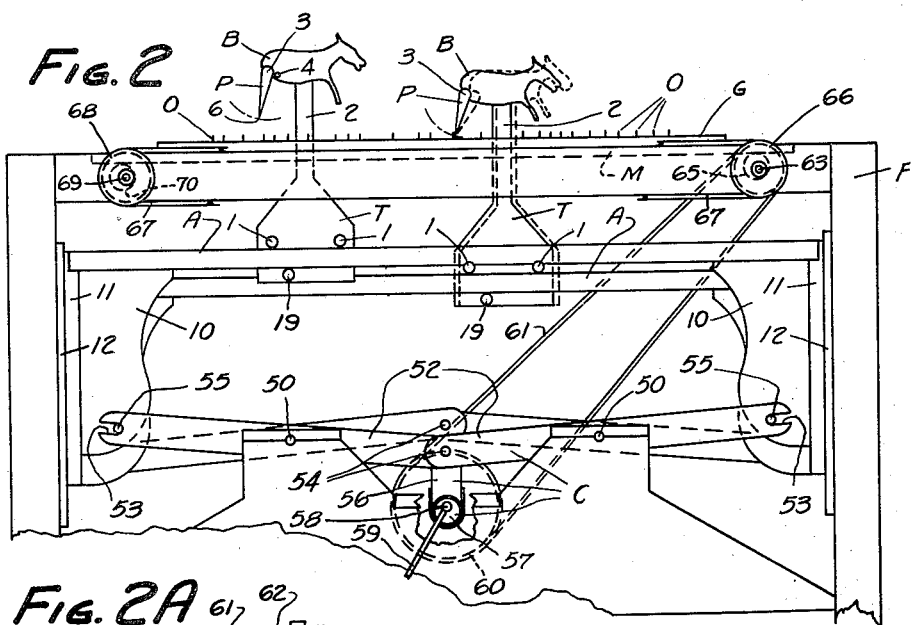
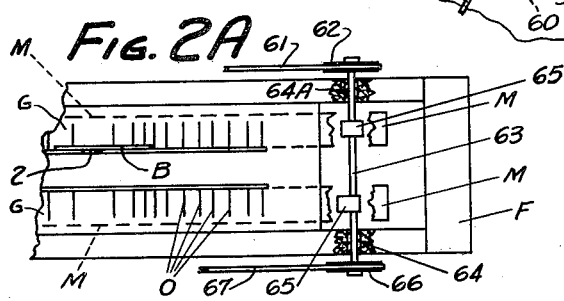

July 22, 1947.   W. C. FORD   2,424,354
AMUSEMENT DEVICE
Filed Feb. 15, 1946   3 Sheets-Sheet 2

INVENTOR
William C. Ford
BY
ATTORNEY

July 22, 1947.  W. C. FORD  2,424,354
AMUSEMENT DEVICE
Filed Feb. 15, 1946  3 Sheets-Sheet 3
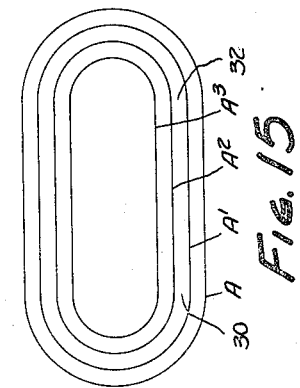
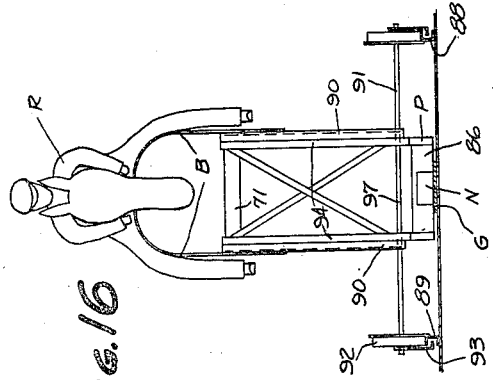
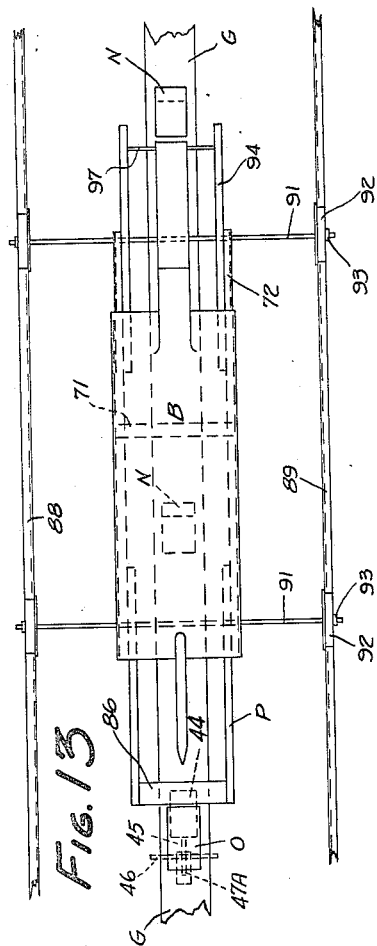
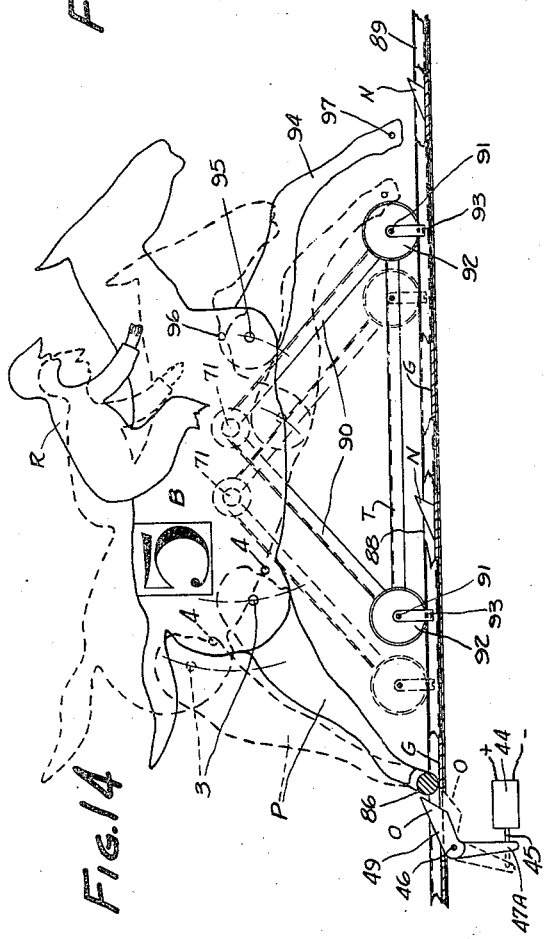
INVENTOR
William C. Ford
BY
Gardner D. Passer
ATTORNEY Patented July 22, 1947

2,424,354

UNITED STATES PATENT OFFICE 2,424,354

AMUSEMENT DEVICE

William C. Ford, Andover, Mass.

Application February 15, 1946, Serial No. 647,782

6 Claims. (Cl. 46—122)

This invention relates to amusement devices of the type in which a plurality of body members simulate a race. It is particularly applicable to the simulation of horse or dog racing in which the hind legs of the animal propel it forward, while moving together, in what actually are a series of leaps or jumps.

It may be embodied in a table toy for home amusement or for an exhibition on a stage or for the use of living riders in actual or seeming competition on a straight track or on an endless track such as one of oval or circular form.

Its fundamental requirements are what I will call for clearness a truck track upon which is movable a truck which preferably moves on wheels, although it might slide on a suitable track, and what I will call a smooth track positioned near the truck track, this smooth track having a top face upon which the free end of a propelling member can slide easily. This smooth track may carry, preferably at irregular intervals, a series of obstructions or it may be without obstructions but may be so arranged that obstructions are moved up so as to project above its smooth surface and retracted at regular or irregular intervals or the entire smooth track with obstructions can be moved up and down.

There are a plurality of parallel truck tracks and corresponding smooth tracks and on each truck track there is a truck each of which on a suitable stand carries a body member, which may be in the form of a horse or a dog, spaced above a parallel smooth track. The tracks can be parallel or concentric.

Each truck track may be movable up and down carrying with it its truck and its body member or it may be stationary and provision may be made to raise and lower the body member from its truck, or the body member may be of such a character that it can rock on a pivot so that its rear end where a pivot for a propelling member is located will move up and down with the rocking motion of the body member.

The propelling member may be a single member or a member made of two parts to simulate the two hind legs of a horse or dog and in any case it is carried by the pivot at the back of the body member in such a position that it will hang with its free end a little back of the perpendicular so that when the pivot and the back of the body member are raised either by rocking or by other means, its free bottom end will be clear of the smooth track. To be sure that it hangs in a proper position so that when the pivot moves down, it will not be on dead center or its free end will not slip forward, there should be a suitable stop associated with the body.

The principle of operation of my device is to so associate the propelling member and its pivot with the body member and the smooth track and obstructions that when the pivot moves down a certain distance the free end of the propelling member will strike the smooth face of the smooth track and as the downward motion continues, it will slip back until it engages an obstruction, provided there is an obstruction within its distance of movement, and if and when it does strike such an obstruction, the continued downward movement of the pivot and that part of the body, by the composition of forces, will push the body and its truck forward a greater or less distance depending upon how quickly the free end of the propelling member strikes a projection and how much of a continued downward motion of the pivot, there is after such engagement.

To simulate the competition of a race, the various truck tracks with their respective bodies, which may simulate horses, can be moved up and down together or independently, the various smooth tracks or their projections can be moved up and down together, or independently, the position of the projections on various tracks can be varied as much as desired, and the speed of the respective motions of each track, truck and body assembly and of each smooth track and obstruction assembly, can be varied as much as desired.

This arrangement is suitable for a toy, but for a stage exhibition or a full sized simulation of a race with human beings competing, I find it convenient to have the truck track stationary and to provide between each truck and its body member either a motor, such as of the electrical type, to raise and lower the body, or to pivot the body to a stand on a truck so that a human rider can rock it by man power thus raising and lowering its back end with a pivot for and a propelling member.

For such a competitive race device, I find it convenient to have a stationary smooth track and to have associated with each track a series of obstructions each of which can be independently moved up and down or all of which can be moved together, or some of which can be moved together thereby introducing an unlimited number of possible elements in the competition.

The means for moving the pivots of the propelling members up and down should be independent of and not synchronized with means for moving the obstructions up and down but as an alternative device or variation thereof, I can use a rocking arrangement operable by a human passenger with certain up and down limits and so associated with a stationary smooth track with fixed obstructions, which preferably are spaced at irregular ntervals, with no interval between any two adjoining obstructions which is greater than the greatest distance which the free end of a propelling member will move when the maximum up and down movement of the pivot is produced.

In the drawings,

Fig. 1 is a front elevation and Fig. 2 is a front elevation of my device in the form of a mechanical toy with the parts in a different position.

Fig. 2A is a plan view of one end, the right end, of the construction shown in Figs. 1 and 2.

Figs. 3, 4, 5, and 6 are diagrams to illustrate the propelling principle applied to each moving body.

Figures 7, 8:
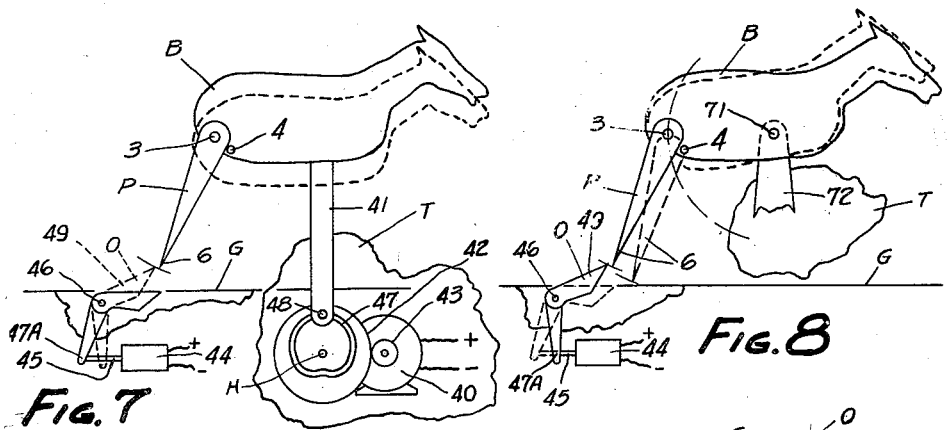

Figs. 7 and 8 are diagrammatic side elevational views of a mechanism to raise and lower the bodies and to raise and lower the projections to raise them above or to lower them below a smooth track.

Figures 9, 10:
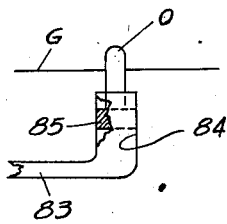

Fig. 9 is a diagram showing another method of raising and lowering a movable obstruction.

Figure 11:
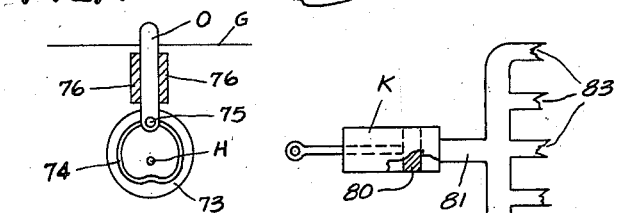

Fig. 10 is a diagrammatic plan view of an hydraulic system for operating the obstructions and Fig. 11 is an elevation illustrating the construction of one of the hydraulic pistons associated with the construction shown in Fig. 10.

Figure 12:
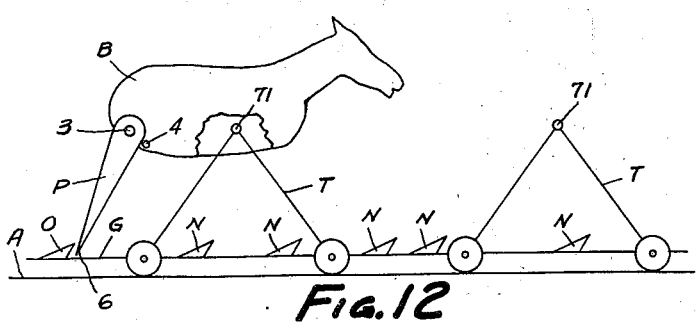

Fig. 12 is a diagrammatic side elevation showing the various parts including the two tracks, trucks and bodies of a construction where the body is pivoted to a truck.

Fig. 13 is a plan view of a construction where the body in the shape of a horse is pivoted on a truck which is movable on a track.

Fig. 14 is an elevational view of a construction similar to what is shown in Fig. 13 but including the outline of a human rider. In this view the position of the body in the form of a horse is shown in full and dotted lines as it is rocked and pivoted as by a human rider.

Fig. 15 is a diagrammatic plan view of a plurality of concentric truck tracks.

Fig. 16 is a front elevation of the construction such as shown in Fig. 14.

In all the views, F indicates a frame which might be very small as in a toy or very large like the floor of a stage or the supporting devices for a number of truck and smooth tracks for full size imitation horses to be ridden by human beings.

A represents a truck track which, as shown, is straight but which might be oval or circular and might be of metal or wood or other material; there being ordinarily two or more parallel or concentric tracks.

C represents broadly a means to move each truck track which might carry with it a truck indicated by T, carrying a body B which might represent a horse, a dog or even a seat, the truck and body being movable together on a track.

G represents what I will call for convenience a smooth track each of which is nearly parallel with and close to each truck track and proximate the free end of a propelling member or members indicated generally by P pivoted to the back of a body B. O indicates obstructions which may be attached to a smooth track G, or may move independently, and C represents means to move each frame M carrying a track G and obstructions O.

In Figs. 1 and 2 the frame F is shown as being provided with a plurality of track frames 10 each pair carrying a truck track A and a truck T and each having at each end straight runners such as 11 which allow this frame 10 to be moved up and down, by the means C, in guides 12. Means C, as shown, include the rocker arms 52 each having a slot 53 at one end to engage the end pivots 55 on a truck track frame 10, each being pivoted medially at 59 and to a pivot 54 on an eccentric rod 56 which is moved up and down by an eccentric 57 on a drive shaft 58, shown as being operable by a handle 59.

Free to move on each track A is a truck T having wheels 1, 1 and if necessary, a counter weight or guide 19, and supported by a stand 2 on each truck is a body B, each body being provided with a back pivot 3 and a stop 4 whereby a propelling member P, which at one end 5 is pivoted to 3 and is so checked by the stop 4 that its free end 6, will normally hang a little back of the perpendicular.

G is a smooth track carried by the frame F with a smooth surface except where it is provided with fixed obstructions O, O, which are preferably at irregular distances. Each smooth track G is in such a position with reference to the track A, truck T, body B and propelling member P that the free end 6 of its propelling member P when all the parts are in one position such as shown in Fig. 3, is clear of track G and of each obstruction O.

Figures 3, 4, 5, 6:
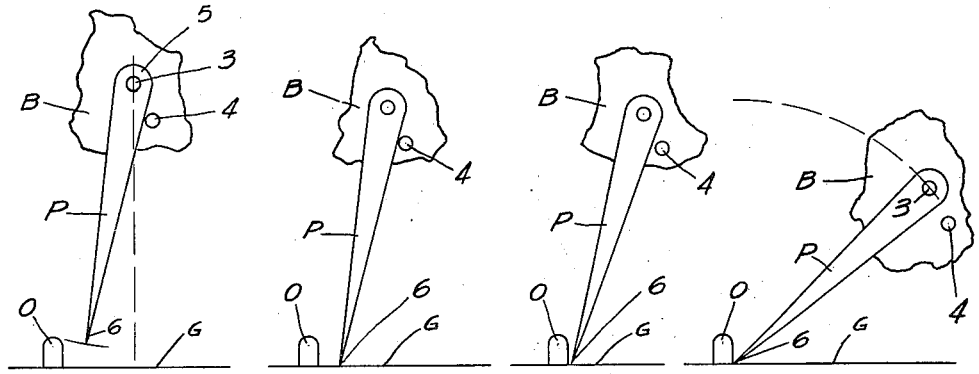

However, when the track A, truck T, body B and propelling member P are brought down or the smooth track S is moved up or when both motions occur, the free end 6 will first touch the top of track G as shown in Fig. 4, and as the motion continues, will slip back as shown in Fig. 5 until it engages an obstruction O, whereupon as the motion still continues and as obstruction O will not give way, the other end at 5 of the propelling means P will force the body B with its truck T forward a distance which is determined by the extent of the various movements and the position of the obstructions O.

As a means to move the obstructions O vertically, which in this construction requires that the track G should also be moved up and down, I show in Figs. 1, 2A and 2, a pulley 60 on the main drive shaft 58 which through a belt 61 drives a first cam shaft pulley 62 on a first cam shaft 63 carried in bearings 64 and 64A in frame F and carrying cams 65, 65 each positioned under one end of a smooth track G.

66 is a connecting pulley on the other end of first cam shaft 63 for a connecting belt 67 which also travels around a pulley 68 on a second cam shaft 69 which carries cams 70, 70, each under the other end of a frame M which supports a track G. By properly arranging and setting these cams, each frame M with a track G can be made to rise and fall a greater or less distance or it can be caused to rock thus providing variations which in the construction shown in Figs. 1 and 2, where the bodies are in the shape of horses, produce the appearance of a horse race with the different horses galloping forward with successive leaps of greater or less distance.

Instead of using a vertically movable truck track such as A, I can, as shown in Fig. 7, for each body B use a truck and in place of a stationary stand such as 2, I can provide an electric motor such as 40 on truck T which through a gear 43 engaging a gear on a channel cam 47 and a cam follower 48, all carried on a truck T, will move such a movable stand 41 and a body B, carried by it, up and down, and in place of means such as C to move the truck track G up and down, I can use a stationary smooth track G up through which each movable obstruction such as O can be projected by an armature 45 of a solenoid such as 44. As shown, each obstruction O is an arm 49 of a bell crank lever pivoted to G at 46 and connected to 45 at 47A. Gravity or a spring, not shown, will drop O when the current is off.

The motor 40 and the solenoid 44 can be on separate circuits or separately controlled and as the smooth track does not move and the truck track does not move, the body B must drop down enough so that the free end 6 of its propelling member P will engage the top of a smooth track G and then slip back until it meets an obstruction O as shown in Figs. 3, 4, 5 and 6.

As shown in Fig. 8, I can vary this construction by carrying a body B on a pivot 71 like a rocking horse, the pivot being carried by a stand such as 72 supported by a truck T.

The solenoid construction such as shown in Fig. 7 can be used in this case to move the obstructions up and down and a human rider on a body B representing a horse can rock it back and forth on pivot 71 to bring the free end 6 or 86 of a propelling member P down in contact with the smooth track G and with an obstruction such as O. See Figs. 12, 13, 14, 16.

If desired, instead of using a separate solenoid for each obstruction, as shown in Fig. 9, I can use a series of transverse shafts such as H, each of which carries channel cams such as 73 each formed with a channel 74 in which is a follower 75 which causes an obstruction O to move up and down in the guides 76.

Still another means for moving the obstructions up and down is shown in Figs. 10 and 11 where a hydraulic system is diagrammatically represented.

K is a master hydraulic cylinder with a master piston 80 which can be operated by power or manually to force a liquid through a master pipe 81 and thence by way of branches 83 under each track into individual cylinders 84 provided with pistons 85 which terminate in or are a part of obstructions O.

The liquid in such a system can be caused to force the pistons 85 up and also to suck or pull them back.

Fig. 12 is a diagram showing a truck track A and a smooth track G and some obstructions O which move through it and other fixed obstructions N, N, which rest on it and do not move.

This view also shows trucks which might have two-wheels, three-wheels or four-wheels each of skeleton construction and each with a triangular or truss shaped body which carries a pivot 71 for a body B. Another similar truck T is shown to indicate what happens when a truck with or without a body or horse B on one set of tracks, A and G, gets ahead of the truck with or without a body or horse on another set of tracks A and G. It should be observed that as each truck track A, A1, A2 and A3, ordinarily would be formed with two parallel or concentric rails, such as 88, 89, Figs. 13, 14 and 15 and as the propelling members such as P may represent the hind legs of a horse or a dog, connected together, as by 86, so as to work together but between rails 88, 89 of a truck track or not so connected together, only one smooth surface with obstructions for a smooth track such as G is needed. Such a smooth track G would be parallel to, and might be on a level with, higher than, or lower than its corresponding truck track as shown in Figs. 13, 14 and 16.

A construction is shown in Figs. 13, 14 and 16 in which there are parallel rails 88 and 89 for a track A while the hind legs or the propelling members of the horse body are connected at what corresponds to the hooves by a cross-bar such as 86 which slips along a narrow smooth track S until, or unless, it encounters either a fixed obstruction such as N or a movable obstruction such as O which has been moved up to be engaged by it as shown in full lines in Fig. 14.

In this construction the truck body is a framework of triangular form 90 carried by the axles 91, 91, and flanged wheels 92, from which depend the holding devices 93, similar to 19 in the constructions shown in Figs. 1 and 2.

The body B is shown as in the shape of a horse with a rider R which might be a human being, a manikin or it might be omitted.

In this case, the front legs 94 are shown as pivoted to the body B at 95 and are provided with stops 96 which do not permit them to drop too far down although if a connecting member 97 strikes the smooth track G, it will ride over any fixed obstructions such as N or movable obstruction such as O.

It is desirable that the racing bodies or horses, whether in the form of a toy or on a stage, or on a full size race track, should be capable of getting back to the starting point. In a toy, the obstructions alone or with the smooth track can be dropped away and the trucks and racing bodies moved back by hand.

On a full sized straight away track, fixed obstructions N preferably are not used but by merely pulling a switch or turning off the power which pushes up obstructions such as O, the trucks with their racing horses or bodies can all be pushed back on the truck tracks A, the propelling members P either being clear of the smooth track G or their free ends slipping back on unobstructed track G.

However, as shown in Fig. 15, where an oval race course is used with a series of truck tracks such as A, A1, A2, and A3, there may or may not be a straight away section, as between 30 and 32 but in whatever form my idea is embodied, the electrical circuit for the solenoids which raise the track obstructions can be made with suitable cut out switches for the solenoids for the obstructions for each track so that when a horse comes to the finish line, while he may continue to kick, the obstructions are removed and he cannot push himself forward. Such a device might be any kind of an electric switch for each track or a valve in case of an hydraulic device or any kind of disconnecting lever, belt or gear, if mechanical means are used to move the obstructions. Meanwhile the horses on the other tracks keep kicking themselves along until the power is shut off from the obstructions associated with each smooth track.

To equalize the chances and to regulate the speed on an oval or a round track as between the inside and outside tracks or the pole horse and the outside horse, while the perimeter of the inside track is less than that of the outside track, the obstructions can be closer on the outside than on the inside track; the frequency of the rising and falling of movable projections can be greater on the outside than on the inside track or if the bodies, such as horses, are moved up and down on the truck, this motion can be faster on the outside than on the inside track and in fact there are many other ways in which the chances can be equalized.

In fact there are so many uncertain elements which can be introduced such as just mentioned, that the element of chance for each body on its respective track as compared to the others is almost unlimited.

It is understood that the relative motion between the pivot of the propelling member and the smooth track, so-called, might be produced by the track itself moving with relation to the pivot or by the pivot moving with relation to the track or by both moving; that the relative movement of the pivot towards and away from the smooth track might be produced by moving the truck track with truck, support and body including the pivot up and down, or by moving the body with the pivot up and down with relation to the truck and truck track, or by pivoting the body on a support which is part of a truck.

It is also understood that there must be some obstructions associated with the so-called smooth track and while these might all be fixed in position provided the distance between adjoining projections was less than the length of the path which the free end of a propelling member could move on a smooth track, there might be movable projections which could be moved up above the surface of the smooth track and then retracted, or there might be some fixed and some movable projections; and it is further recognized that if the projections are movable, they might be moved individually or in groups by the use of solenoids on differently arranged and controlled electrical circuits, by hydraulic means, or by mechanical or other means.

While I claim to be the inventor of the simplest arrangement of a single track with either fixed or movable obstructions, as a practical matter, there should be two or more sets of tracks and bodies, the purpose of the device being mainly to simulate a race.

I claim:

1. In an amusement device, the combination of a truck track; with a body carried by said truck track above a smooth track; obstructions spaced along the smooth track; a propelling member so pivoted to the body that its free end is back of the pivot and proximate the smooth track; the pivot of the propelling member being so supported that it can be moved up and down to cause the free end of the propelling member to engage and slip on the smooth track and to engage an obstruction, if one is within its path of slipping, and to then move the pivot and body forward on the truck track.

2. In an amusement device, the combination of two or more truck tracks; with bodies each carried by a truck above a smooth track; a smooth track proximate each truck track; obstructions spaced along each smooth track; a propelling member so pivoted to each body that its free end is back of the pivot and proximate the smooth track; the pivot of the propelling member being so supported that it can be moved up and down to cause the free end of the propelling member to engage and slip on the smooth track and to engage an obstruction, if one is within its path of slipping, and to then move the pivot and body forward on its truck track.

3. In an amusement device, the combination of two or more truck tracks; with bodies each carried by a truck above a smooth truck; a smooth track proximate each truck track; obstructions spaced along each smooth track; means to move some of said obstructions so as to project above and to be retracted from the surface of the smooth track; a propelling member so pivoted to each body that its free end is back of the pivot and proximate the smooth track; the pivot of the propelling member being so supported that it can be moved up and down to cause the free end of the propelling member to engage and slip on the smooth track and to engage an obstruction, if one is within its path of slipping, and to then move the pivot and body forward on its truck track.

4. In an amusement device, the combination of two or more truck tracks; with bodies each carried by a truck above a smooth track; a smooth track proximate each truck track; obstructions spaced along each smooth track; electrically operable means to move some of said obstructions so as to project above and to be retracted from the surface of the smooth track; a propelling member so pivoted to each body that its free end is back of the pivot and proximate the smooth track; the pivot of the propelling member being so supported that it can be moved up and down to cause the free end of the propelling member to engage and slip on the smooth track and to engage an obstruction, if one is within its path of slipping, and to then move the pivot and body forward on its truck track.

5. In an amusement device, the combination of two or more truck tracks; with bodies each carried by a truck above a smooth truck; a smooth track proximate each truck track; obstructions, some being movable, spaced along each smooth track; electrically operable means including a solenoid for each movable projection to move it above the surface of the smooth track and means to withdraw it from that position; a propelling member so pivoted to each body that its free end is back of the pivot and proximate the smooth track; the pivot of the propelling member being so supported that it can be moved up and down to cause the free end of the propelling member to engage and slip on the smooth track and to engage an obstruction, if one is within its path of slipping, and to then move the pivot and body forward on its truck track.

6. In an amusement device, the combination of two or more truck tracks; with bodies each pivoted on and carried by a truck above a smooth track; a smooth track proximate each truck track; obstructions, some being movable, spaced along each smooth track; electrically operable means including a solenoid for each movable projection to move it above the surface of the smooth track and means to withdraw it from that position; a propelling member so pivoted to each body that its free end is back of the pivot and proximate the smooth track; the pivot of the propelling member being so supported that it can be moved up and down to cause the free end of the propelling member to engage and slip on the smooth track and to engage an obstruction, if one is within its path of slipping, and to then move the pivot and body forward on its truck track.

WILLIAM C. FORD.